US011481738B2

(12) United States Patent
Tong et al.

(10) Patent No.: US 11,481,738 B2
(45) Date of Patent: Oct. 25, 2022

(54) AUTOMATED VEHICLE INITIATED SERVICING SYSTEM

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Shige Wang, Northville, MI (US); Jiang-Ling Du, Beaverton, OR (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/163,748

(22) Filed: Feb. 1, 2021

(65) Prior Publication Data

US 2022/0245598 A1    Aug. 4, 2022

(51) Int. Cl.
| | |
|---|---|
| G06Q 10/00 | (2012.01) |
| G07C 5/00 | (2006.01) |
| G06K 7/14 | (2006.01) |
| G06Q 20/32 | (2012.01) |
| G06K 19/06 | (2006.01) |
| G06K 19/07 | (2006.01) |
| G06K 7/10 | (2006.01) |

(52) U.S. Cl.
CPC ......... *G06Q 10/20* (2013.01); *G06K 7/10366* (2013.01); *G06K 7/1417* (2013.01); *G06K 19/06037* (2013.01); *G06K 19/0723* (2013.01); *G06Q 20/3276* (2013.01); *G06Q 20/3278* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 9,283,857 B2 * | 3/2016 | Shelton | B60L 53/31 |
| 10,919,406 B2 * | 2/2021 | Choi | B60L 53/14 |
| 2017/0146354 A1 * | 5/2017 | Boss | G01C 21/3438 |
| 2017/0171178 A1 * | 6/2017 | Reynders | G06Q 20/145 |
| 2019/0016312 A1 * | 1/2019 | Carlson | F17C 5/007 |
| 2020/0139840 A1 * | 5/2020 | Roeder | H04W 4/80 |

OTHER PUBLICATIONS

"2020 Guide on How to Charge Your Electric Car With Charging Stations, 2020, ChargeHub, 5-6" (Year: 2020).*

* cited by examiner

*Primary Examiner* — Kito R Robinson
*Assistant Examiner* — Toan Duc Bui
(74) *Attorney, Agent, or Firm* — Cantor Colburn LLP

(57) ABSTRACT

A vehicle communication and control system includes a servicing host capable of exchanging data with a vehicle. The servicing host provides a vehicle service and includes a service identifier (ID) that indicates the vehicle service. The vehicle is configured to actively detect the service ID and to determine the vehicle service in response to detecting the service ID. The vehicle and the servicing host establish a wireless connection to exchange data and automatically initiate the vehicle service in response to detecting the service ID.

11 Claims, 6 Drawing Sheets

AUTOMATED VEHICLE INITIATED SERVICING SYSTEM

INTRODUCTION

The subject disclosure relates to initiating a vehicle service such as charging an electric vehicle (EV) battery, for example, typically requires the driver to perform various manual tasks before the vehicle service can be initiated.

Conventional vehicles, for example, are typically unable to perform image detection and wireless data communication. As a result, drivers are required to manually provide payment information, select service types, and manually initiate the performance of the vehicle service. However, the requisite payment information and/or vehicle information to perform the vehicle service may not be readily available to the driver. As a result, drivers may find performing various vehicle services to be cumbersome and inconvenient.

SUMMARY

According to an exemplary embodiment, a vehicle communication and control system comprises a servicing host configured to provide a vehicle service. The servicing host includes a service identifier (ID) configured to indicate the vehicle service. A vehicle is configured to actively detect the service ID and to determine the vehicle service in response to detecting the service ID. The vehicle and the servicing host establish a wireless connection to exchange data and automatically initiate the vehicle service in response to detecting the service ID.

The vehicle communication and control system further includes features, wherein automatically initiating the vehicle service comprises automatically initiating a payment transaction to perform the vehicle service, and wherein the servicing host automatically initiates the vehicle service in response to successfully completing the payment transaction.

The vehicle communication and control system further includes a feature, wherein the service ID is a quick read (QR) code that provides service information indicative of the vehicle service and a service provider associated with the vehicle service.

The vehicle communication and control system further includes a feature, wherein the vehicle includes an image sensor configured to detect the QR code, and wherein the vehicle determines the vehicle service in response to detecting the QR code.

The vehicle communication and control system further includes a feature, wherein the service ID is a radio-frequency identification (RFID) tag that stores service information indicative of the vehicle service and the service provider associated with the vehicle service.

The vehicle communication and control system further includes a feature, wherein the vehicle includes an RFID reader configured to detect the RFID tag and receive the service information transmitted from the RFID tag.

The vehicle communication and control system further includes a feature, wherein the vehicle service includes charging a battery of the vehicle.

The vehicle communication and control system further includes a feature, wherein the data exchanged between the vehicle and the servicing host includes battery information associated with the battery of the vehicle.

The vehicle communication and control system further includes a feature, wherein the servicing host calculates at least one charging rate to charge the battery based on the battery information and automatically initiates charging the battery according to at least one charging rate in response to the successful payment transaction.

The vehicle communication and control system further comprises a vehicle ad-hoc computing network in signal communication with the vehicle. The vehicle ad-hoc computing network is configured to receive the service information, to determine whether the service provider is an authorized service provider or unauthorized service provider, and to authorize the wireless connection in response to determining the authorized service provider or to deny the wireless connection in response to determining the unauthorized service provider.

According to another exemplary embodiment, a method is provided to perform a vehicle service. The method comprises providing, by a servicing host, a service identifier (ID) configured to indicate a vehicle service provided by the servicing host. The method further comprises actively detecting the service ID by the vehicle and determining, by the vehicle, the vehicle service in response to detecting the service ID. The method further comprises establishing a wireless connection between the vehicle and the servicing host to exchange data and automatically initiate the vehicle service.

The method further comprises automatically initiating a payment transaction to perform the vehicle service in response to detecting the service ID, and automatically initiating the vehicle service by the servicing host in response to successfully completing the payment transaction.

The method further comprises operations wherein actively detecting the service ID comprises providing, by the servicing host, a quick read (QR) code that provides service information indicative of the vehicle service and a service provider associated with the vehicle service, detecting, by an image sensor installed on the vehicle, the QR code, and processing the QR code to determine the vehicle service and the service provider.

The method further comprises operations wherein establishing the wireless connection between the vehicle and the servicing host comprises determining, by the vehicle, that the service provider is one of an authorized service provider or an unauthorized service provider, establishing a data exchange with the vehicle in response to determining the authorized service provider, and denying the data exchange with the vehicle in response to determining the unauthorized service provider.

The method further comprises operations wherein actively detecting the service ID comprises providing, by the servicing host, radio-frequency identification (RFID) tag that stores service information indicative of the vehicle service and a service provider associated with the vehicle service, detecting, by an RFID reader installed on the vehicle, the RFID tag, and processing digital data received by the RFID tag to determine the vehicle service and the service provider.

The method further comprises operations wherein establishing the wireless connection between the vehicle and the servicing host further comprises determining, by the vehicle, that the service provider is one of an authorized service provider or an unauthorized service provider, establishing a data exchange with the vehicle in response to determining the authorized service provider, and denying the data exchange with the vehicle in response to determining the unauthorized service provider.

The method further comprises automatically performing the vehicle service, wherein the vehicle service includes charging a battery of the vehicle.

The method further comprises exchanging data between the vehicle and the servicing host, wherein the data exchanged between the vehicle and the servicing host includes battery information associated with the battery of the vehicle.

The method further comprises calculating, by the servicing host, at least one charging rate to charge the battery based on the battery information, and automatically initiating charging of the battery according to the at least one charging rate in response to the successful payment transaction.

The method further comprises wirelessly communicating the service information from the vehicle to an ad-hoc computing network, determining, by the ad-hoc computing network the authorized service provider or the unauthorized service provider, authorizing by the ad-hoc computing network the data exchange in response to determining the authorized service provider, and denying by the ad-hoc computing network the data exchange in response to determining the unauthorized service provider.

The method further comprises wherein the servicing host calculates at least one charging rate to charge the battery based on the battery information and automatically initiates charging the battery according to at least one charging rate in response to the successful payment transaction.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
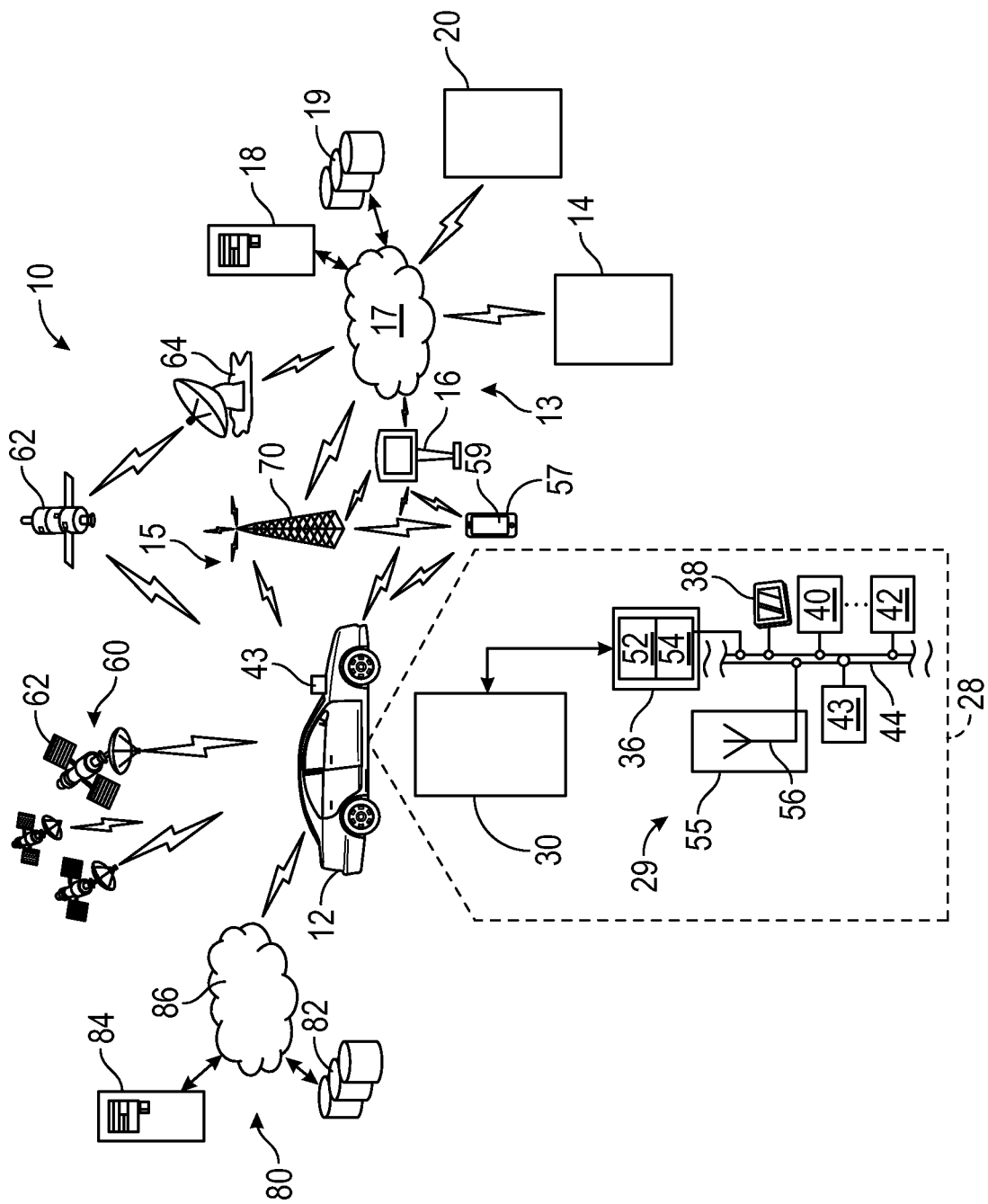
FIG. 1 is a schematic diagram of a vehicle communication and control system according to a non-limiting embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A wide variety of conventional vehicle servicing operations such as charging an electric vehicle, for example, require a vehicle user to manually perform various acts before the service is initiated. For example, a user is typically required to manually locate the vehicle in a position where it can receive the vehicle service, select a specific vehicle service offered by the service provider, and manually submit payment information to initiate the vehicle service.

In accordance with an exemplary embodiment, an automated vehicle initiated servicing system is provided that eliminates one or more manual acts that are typically required when performing various vehicle servicing operations. In one example, an automated vehicle initiated servicing system described herein can automatically initiate charging of an EV battery and automatically initiate and complete payment for charging the battery.

FIG. 1 schematically illustrates an operating environment that comprises a vehicle communication and control system 10 configured to automatically perform a vehicle service associated with a vehicle 12. The communication and control system 10 includes the vehicle 12, a vehicle servicing network 13, and one or more wireless data exchange systems 15. Although one vehicle 12 and one vehicle servicing network 13 are illustrated, the communication and control system 10 can include additional vehicles 12 and/or vehicle servicing networks 13 without departing from the scope of the inventive teachings.

The vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 12 employs a power and electrical system 28 that includes various vehicle electronic devices 29. The vehicle electronic devices 29 include, but are not limited to, a vehicle controller 36, a visual display 38, a global position system (GPS) controller 40, one or more vehicle system modules (VSMs) 42, and one or more sensors 43. A communications bus 44 is provided to facilitate signal communication among the vehicle electronic devices 29. Examples of a suitable communication bus include, but are not limited to, a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Vehicle controller 36 can be an OEM-installed (embedded) or aftermarket device that is installed in the vehicle 12 and enables wireless voice and/or data communication via the wireless data exchange system 15. The vehicle controller 36 can utilize radio transmissions to establish a communications channel (a voice channel and/or a data channel) with the wireless data exchange system 15 so that voice and/or data transmissions can be sent and received over the channel. By providing both voice and data communication, vehicle controller 36 enables the vehicle 12 to offer a number of different services including those related to navigation, telephony, emergency assistance, diagnostics, infotainment, etc. Data can be sent either via a data connection, such as via packet data transmission over a data channel, or via a voice channel using techniques known in the art.

According to a non-limiting embodiment, the vehicle controller 36 includes an electronic processing device 52 and one or more memory devices 54. The processor 52 can be any type of device capable of processing electronic instructions including microprocessors, microcontrollers, host processors, controllers, vehicle communication processors, and application specific integrated circuits (ASICs). It can be a dedicated processor used only for vehicle controller 36 or can be shared with other vehicle systems. The processor 52 executes various types of digital instructions, such as software or firmware programs stored in memory 54, which enable the vehicle controller 36 to provide a wide variety of services. For instance, processor 52 can execute programs or process data to carry out at least a part of the method discussed herein.

The vehicle controller 36 can control various vehicle operations including, but not limited to: powertrain control, autonomous driving, battery and power management; wireless data communication; turn-by-turn directions and other navigation-related services that are provided in conjunction with the GPS controller 40; airbag deployment notification and other emergency or roadside assistance-related services that are provided in connection with one or more collision sensor interface modules such as a body control module (not shown); vehicle diagnostics and diagnostic reporting using one or more diagnostic modules; infotainment-related services where music, webpages, movies, television programs, videogames and/or other information is downloaded by an infotainment module (not shown) and is stored for current or later playback.

The vehicle operations described herein are by no means an exhaustive list of all of the capabilities of the vehicle controller 36, but are simply an enumeration of some of the operations that the vehicle controller 36 is capable of controlling. Furthermore, it should be understood that at least some of the aforementioned modules and/or controllers can be implemented in the form of software instructions saved internal or external to the vehicle controller 36, they could be hardware components located internal or external to vehicle controller 36, or they could be integrated and/or shared with each other or with other systems located throughout the vehicle 12, to cite but a few possibilities. In the event that the modules and/or controllers are implemented as VSMs 42 located external to the vehicle controller 36, they can utilize communications bus 44 to exchange data and commands with the vehicle controller 36.

In terms of wireless data communication, the vehicle controller 36 can wirelessly exchange data using a vehicle wireless communication system 55. The vehicle wireless communication system 55 can utilize cellular communication according to either GSM or CDMA standards and thus includes a standard cellular chipset for voice communications like hands-free calling, and a wireless modem for data transmission. It should be appreciated that the modem can either be implemented through software that is stored in the vehicle controller 36 and is executed by processor 52, or it can be a separate hardware component located internal or external to vehicle controller 36. The modem can operate using any number of different standards or protocols such as EVDO, CDMA, GPRS, and EDGE.

One of the networked devices that can communicate with the vehicle controller 36 is a mobile wireless device 57. The mobile wireless device 57 can include, but is not limited to, a smart phone, smart wearable device, and a tablet computer. The mobile wireless device 57 can include computer processing capability, a transceiver capable of communicating using a short-range wireless protocol, and a visual display 59. In some implementations, the visual display 59 also includes a touch-screen graphical user interface.

The vehicle controller 36 can also utilize the wireless communication system 55 to communicate wirelessly via antenna 56 according to one or more short-range wireless protocols, such as any of the IEEE 802.11 protocols, WiMAX, or Bluetooth. When used for packet-switched data communication such as TCP/IP, the vehicle controller 36 can be configured with a static IP address or can set up to automatically receive an assigned IP address from another device on the network such as a router or from a network address server. The wireless protocols can be used to carry out or implement wireless access points (WAPs) at the vehicle 12. As part of providing a WAP, the vehicle 12 can generate a broadcast identifier, such as a network name, that can be used by other wireless devices using short-range wireless protocols to identify the WAP and/or the vehicle 12 operating the WAP.

The vehicle controller 36 can also be configured to implement a mobile payment system. The mobile payment system can involve short-range wireless communication protocols involving near-field communications (NFC) or short-message service (SMS) messages, which exchange payment information with the vehicle servicing network 13.

Mobile payment systems use wireless communication systems to transmit information associated with a purchaser to the vehicle servicing network 13 that uses the information to charge payment to a purchaser's account. As noted herein, a variety of different mechanisms can be used to implement the mobile payment systems, such SMS messages and NFC. SMS messages transmitted from the vehicle controller 36 can include security tokens that include account information of the purchaser using the vehicle 12. The security tokens may be referred to as software tokens that can be small data files stored in the memory devices 54 of the vehicle controller 36. The vehicle controller 36 can duplicate the security tokens and wirelessly transmit them to the vehicle servicing network 13 that can use them to identify the sender (in this implementation, a purchaser). The security tokens can be implemented using a cryptographic key that converts data into security tokens using a cryptographic hash function. In some implementations, the security tokens can be a message authentication code (MAC), but other ways of implementing security tokens will be apparent to those skilled in the art. The security tokens can be installed or otherwise provided to the vehicle 12 as is known to those skilled in the art.

With continued reference to the vehicle electronic devices 29, the GPS controller 40 receives radio signals from a GPS satellite system 60. From these signals, the GPS controller 40 can determine vehicle position that is used for providing navigation and other position-related services to the vehicle driver. Navigation information can be presented on the display 38 (or other display within the vehicle 12) or can be presented verbally such as is done when supplying turn-by-turn navigation. The navigation services can be provided using a dedicated in-vehicle navigation module (which can be part of GPS controller 40), or some or all navigation services can be done via vehicle controller 36. In one or more non-limiting embodiments, the position information is sent to a remote location for purposes of providing the vehicle 12 with navigation maps, map annotations (points of interest, restaurants, etc.), route calculations, and the like. The position information can be supplied to a cloud computing network to confirm the location of the vehicle 12 in relation to the vehicle servicing network 13.

The VSMs 42 can be constructed in the form of electronic hardware components that are located throughout the vehicle 12. Although the VSMs 42 are illustrated as individual modules separate from the vehicle controller 36, it should be appreciated that one or more of the VSMs 42 can be integrated in the vehicle controller 36.

The VSMs 42 can receive input from one or more of the sensors 43 and use the sensed input to perform diagnostic, monitoring, control, reporting and/or other functions. Each of the VSMs 42 can be connected by communications bus 44 to the other VSMs, as well as to the vehicle controller 36, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a power and battery control module that monitors and controls operations of an EV battery 30 such as power output, charging, etc. As is appreciated by those skilled in the art, the VSMs 42 described herein are only examples of some of the modules that may be used in vehicle 12, as numerous others are also possible.

In one or more embodiments, the sensors 43 include an image sensor 43 or an RFID reader 43 in signal communication with the vehicle controller 36. The image sensor 43 can include a camera, or any other type of imaging device suitable for the purposes described herein, that are capable of receiving light, or other radiation, and converting the light energy to electrical signals in a pixel format using, for example, charged coupled devices (CCD). Each of the image sensors 43 may also be operable to capture images in various regions of the electromagnetic spectrum, including infrared, ultraviolet, or within visible light. The image sensors 43 may also be operable to capture digital images and/or video data in any suitable resolution including high-definition. As used in the present disclosure, image data includes either individual images or a stream of video images. The image sensors 43 may be any digital video recording device in connection with a processing unit of the vehicle 12 such as, for example, the vehicle controller 36.

In at least one embodiment, an image sensor 43 is configured to visually capture one or more objects located in the sensor's field of view (FOV). The captured object is then delivered to the vehicle controller 36 where it is further processed. In one or more embodiments, the image sensor 43 can capture a quick response code ("QR code") serving as a service ID associated with a service center 14.

QR codes are generally a type of machine-readable optical label that encode information about an item to which they are attached. QR codes may include any of a number of standard encoding types, and include black squares arranged in a square grid on a white background, which can be read by an imaging device such as a camera to determine the encoded information. The image of the QR code can be processed to extract the encoded information from patterns that are present in both horizontal and vertical components of the image.

The image of the QR code is delivered to the vehicle controller 36, where it is processed to convey service information associated with the service center 14. The service information includes, but is not limited to, a type of vehicle service that can be provided to the vehicle 12 via a servicing host 16, and a service provider identifier (e.g., name) that identifies the service center 14 associated with providing the vehicle service.

The RFID reader 43 can include a wireless transceiver (e.g., a Bluetooth transceiver) configured to detect an RFID tag serving as a service ID associated with the service center 14. The RFID reader 43 can actively output an electromagnetic interrogation pulse. When the RFID reader 43 is located near the RFID tag, the electromagnetic interrogation pulse can initiate the RFID tag such that RFID tag transmits digital data back to the RFID reader 43. The digital data is indicative of the service information associated with the service center 14 as described herein.

The power and electrical system 28 further implements a vehicle battery 30. In one or more non-limiting embodiments, the vehicle battery 30 includes an electric vehicle (EV) traction battery configured to provide power to the vehicle propulsion system and the vehicle electronic devices 29. The specifications of the EV battery 30 (e.g., the number of battery cells, battery capacity, charging rate, etc.) may vary based on the type and/or make of the vehicle 12. For example, an EV car may utilize a battery 30 having a battery capacity of about 100 kilowatts per hour (kWh), while an EV truck may utilize a larger battery 30 having a higher battery capacity of about 200 kWh. In addition to having extended discharge times, higher capacity batteries may be charged at a faster rate compared to lower capacity batteries.

In one or more non-limiting embodiments, the vehicle controller 36 stores battery information associated with the battery 30. For instance, the vehicle controller 36 can store battery information indicating the battery type, battery capacity, maximum charging rate, remaining available battery charge, etc. In this manner, the vehicle controller 36 can exchange the battery information with the vehicle servicing network 13 as described herein.

The wireless data exchange system 15 can include a cellular telephone system that includes one or more cell towers 70, as well as any other networking components capable of exchanging data in the vehicle communication and control system 10. The cell tower 70 includes sending and receiving antennas and a base station. The cellular telephone system can implement any suitable communications technology, including for example, analog technologies such as AMPS, or the newer digital technologies such as CDMA (e.g., CDMA2000; 1×EV-DO), GSM/GPRS, HSPA+, 4G LTE, or 5G. As will be appreciated by those skilled in the art, various cell tower/base station arrangements are possible and could be used with wireless data exchange system 15. For instance, the base station and cell tower could be co-located at the same site or they could be remotely located from one another, each base station could be responsible for a single cell tower or a single base station could service various cell towers.

Apart from using the wireless data exchange system 15, a different wireless data exchange system in the form of satellite communication can be used to provide uni-directional or bi-directional communication with the vehicle 12. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of cellular data communication.

The vehicle servicing control network 13 includes the service center 14, the servicing host 16, and a service cloud computing network 17. The service center 14 is operated by a service provider and receives account information from a user of the vehicle 12 seeking to establish an account associated with a vehicle service provided by the service center 14. The vehicle service can include various electromechanical services such as, for example, vehicle charging, vehicle washing, vehicle fueling, vehicle oil replacement, vehicle parking/valet servicing, etc.

The servicing host 16 employs one or more components configured to perform the vehicle. In terms of an EV charging station, for example, the servicing host 16 employs the electrical charging unit, the connector, and the control logic necessary to charge the EV battery 30 of the vehicle 12. In another example, a car wash employs the water source, hoses, brushes, track system, control logic, etc., necessary to automatically wash the vehicle 12. In some embodiments the servicing host 16 operates remotely (i.e., at a different location) from the service center 14, while in other embodiments the servicing host 16 operates at the same location as the service center 14.

The service cloud computing network 17 is in signal communication with the service center 14 and the servicing host 16. The service cloud computing network 17 includes one or more service computers 18 and one or more service cloud servers 19. The service cloud servers 19 can store servicing data associated with the vehicle service available to the vehicle 12. The servicing data includes, but is not limited to, user account information, payment information, types of available services that can be performed with respect to set pricings, etc.

The service computer 18 is in signal communication with the servicing host 16 to assist in controlling the performance of the vehicle service. For example, the service computer 18 can authorize the servicing host 16 to perform a given vehicle service in response to receiving a corresponding payment. The service computer 18 can also be updated in real-time with the vehicle services provided by the service provider. The service computer 18 can then update the servicing host 16 with the most up-to-date available vehicle services, which can then be presented (e.g., displayed) to a user located at a given servicing host 16.

In one or more embodiments, the vehicle 12 (e.g., the vehicle controller 36) implements a mobile payment system that facilitates automated payment for a vehicle service. For example, the vehicle 12 can detect the presence of the servicing host 16 associated with the service center 14, automatically request an available vehicle service provided by the servicing host 16, and automatically authorize the service center 14 to charge the vehicle user's payment account (e.g., credit card account, debit account, etc.). In this manner, payment and initiation of the vehicle service can be automatically performed with little to no intervention by the vehicle user.

The vehicle 12 can detect the presence of the servicing host 16 using one or more vehicle sensors 43 such as, for example, the image sensor described herein. In one or more embodiments, the servicing host 16 includes service identifier (ID) (generally referred to as a "a service handle container), which can be detected by the image sensor 43. The service ID can include, for example, markers, targets, or quick read (QR) codes located within the FOV of the image sensor 43.

The servicing host 16 can utilize the QR code to convey a service handle or information associated with the service center 14. The information includes, for example, connection data that allows the vehicle 12 to establish a data exchange with the vehicle servicing network 13 and/or a website Uniform Resource Locator (URL) which when processed directs a user to the website associated with a service provider, advertisement, etc. The QR code can be presented as a tag, sticker or digital image coupled to the servicing host 16. Once the QR code appears in the image sensor's FOV, an image of the QR code is captured and delivered to the vehicle controller 36 for processing and decoding.

In at least one non-limiting embodiment, QR codes included as the service ID s can be used to automatically initiate the mobile payment and performance of the vehicle service. More specifically, the image sensor 43 can detect a QR code while approaching the servicing host 16. The captured image of the QR code is delivered to the vehicle controller 36, where it is processed to obtain service information associated with the service center 14.

In one or more non-limiting embodiments, the vehicle communication and control system 10 includes a vehicle ad-hoc computing network 80. The vehicle ad-hoc computing network 80 includes one or more ad-hoc servers 82 and one or more ad-hoc computers 84. The ad-hoc servers 82 and one or more ad-hoc computers 84 can be located in an ad-hoc cloud-computing network 86 configured to communicate wirelessly with the vehicle 12. The ad-hoc servers 82 can store vehicle data associated with the vehicle 12. The vehicle data includes, but is not limited to, identified service centers 14 that are authorized to exchange data with the vehicle 12.

The ad-hoc computer 84 can be one of a number of computers accessible via a private or public network such as the Internet. The ad-hoc computer 84 can be used for one or more purposes, such as a web server accessible by the vehicle 12 via vehicle controller 36 and the wireless data exchange system 15. The ad-hoc computer 84 can also be utilized to perform diagnostic operations based on diagnostic information provided by the vehicle controller 36, to access or receive vehicle data or for setting up or configuring subscriber preferences, or controlling vehicle functions, and/or to provide Internet connectivity such as DNS services or as a network address server that uses DHCP or other suitable protocol to assign an IP address to the vehicle 12.

In one or more non-limiting embodiments, the ad-hoc computer 84 can authorize a data exchange between the vehicle 12 and the servicing host 16 associated with the service center 14. For example, the vehicle 12 can capture a QR code that identifies a given service center 14 capable of exchanging data with the vehicle 12, and communicate the identified service center 14 to the ad-hoc computing network 80. The ad-hoc computer 84 compares the identified service center 14 to the authorized service centers 14 listed in the ad-hoc servers 82. When the identified service center 14 is not authorized (i.e., the service provider associated with the service center 14 is an unauthorized service provider), the information associated with the QR code can be ignored and the ad-hoc computer 84 controls the vehicle 12 to deny data exchange with the identified service center 14. When, however, the identified service center 14 is included in the list of authorized service centers, the ad-hoc computer 84 controls the vehicle 12 to allow data exchange with the identified service center 14. Accordingly, the vehicle controller 36 can provide vehicle data to the servicing host 16 and initiate payment for the vehicle service using the mobile payment system described herein.

Once payment has been completed, the vehicle 12 and the servicing host 16 can proceed to exchange further information necessary to facilitate performance of the vehicle service. In terms of vehicle charging, for example, the vehicle 12 can wirelessly transmit vehicle data indicating the model and make of the vehicle, the battery type installed in the vehicle, etc. The servicing host 16 can receive the vehicle data, and calculate various available charging rates for charging the EV battery 30. Once the charging rate(s) is calculated, the servicing host 16 can either automatically begin charging the vehicle 12 based on a predetermined charging rate and/or targeted charging level set in a user's profile stored by the service center 14 or offer the user an option of selecting among different charging rates or targeted charging levels according to different prices set by the service center 14.

The vehicle 12 can exchange data with the servicing host 16 using a short-range wireless link. In some embodiments, the short-range wireless link uses NFC, while in other embodiments, IEEE 802.11 protocols or Bluetooth Low Energy (BLE) could be used. The servicing host 16 can include electronic hardware, such as a microprocessor, a memory device, a transceiver, and an antenna, that collectively facilitate wireless communications between the servicing host 16, the vehicle 12 and servers of a third-party credit issuer 20. The servicing host 16 can communicate via the short-range wireless communication connection, the wireless data exchange system 15.

The service computer 18 can communicate with servers of the third-party credit issuer 20 that authorizes service payment transactions between the user of the vehicle 12 (i.e., the purchaser) and the service center 14 (i.e., the service provider). The third-party credit issuer 20 is a term that encompasses an acquiring bank, a card-issuing bank, or both. The acquiring bank can be used by the service center 14 to receive funds on its behalf while the card-issuing bank can provide funds on the purchaser's behalf and debit those funds to a credit account associated with the purchaser. In response to completing the service payment transaction, the service computer 18 can command the servicing host 16 to initiate the vehicle service.

Figure 2:
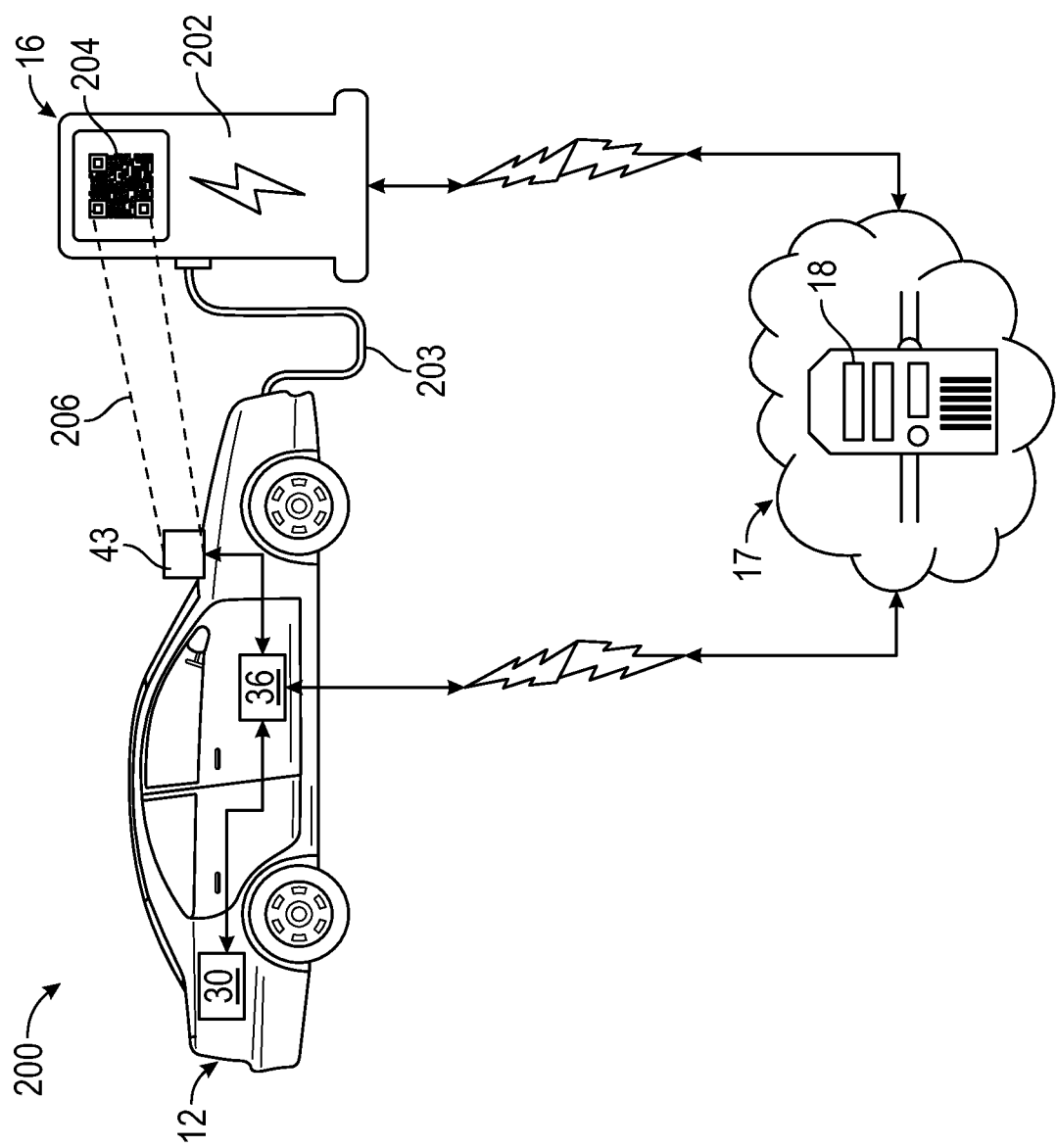
FIG. 2 depicts an automated vehicle initiated servicing system according to a non-limiting embodiment.

Turning now to FIG. 2, an automated vehicle initiated servicing system 200 is illustrated according to a non-limiting embodiment. The automated vehicle initiated servicing system 200 facilitates data exchange between a vehicle 12 and a servicing host 16 via a wireless computing network such as, for example, cloud computing network 17. The data exchange facilities the automatic payment and/or performance of a vehicle service. As one example, the automated vehicle initiated servicing system 200 is illustrated as an automated vehicle charging system 200 configured to automatically charge an EV battery 30 of the vehicle 12. However, it should be appreciated that other vehicle services (e.g., an automated car wash) can be provided by the automated vehicle initiated servicing system 200 without departing from the scope of the disclosure.

The servicing host 16 includes an EV charging station 202 that includes various components (e.g., power supply, power controller, software logic, charging connector, etc.) for charging the EV battery 30 of the vehicle 12. Although the EV charging station 202 is illustrated as having a mechanical charging connector 203 configured to establish a wired connection between the vehicle 12 and the charging station 202, it should be appreciated that other EV charging station architectures can be implemented. For example, the charging connector 203 can be replaced with a charging pad that allows for wirelessly charging a vehicle that is located above or in close proximity of the pad.

As described herein, the vehicle 12 includes one or more image sensors 43 configured to capture an image of a QR code 204 associated with the servicing host 16. The QR code 204 can be coupled to the servicing host 16 in the form of a sticker or tag. The QR code 204 can also be a digital image displayed on an electronic display provided included with the charging station 202.

When the QR code 204 appears in the FOV 206 of the image sensor 43, the captured QR code image is delivered to the vehicle controller 36 and is processed to initiate a data exchange between the vehicle 12 and the charging station 202. The exchanged data includes, but is not limited to, battery information indicating the battery type, battery capacity, maximum charging rate, remaining available battery charge, prices corresponding to charging levels, charging durations and/or different battery charging rates, a user's selection of a given charging level, charging duration and/or battery charging rate, and payment information (e.g., credit/debit card information) to allow a user to pay for a selected charging rate.

In one or more non-limiting embodiments, the servicing host 16 can receive the battery information from the vehicle 12 and calculate various charging profiles corresponding to different prices based on the battery information. For example, the battery information can indicate that the vehicle type and/or specifications of the battery 30 implemented in the vehicle 12 and the remaining available battery charge. The servicing host 16 can then determine that the battery 30 is a high-capacity battery 30 (e.g., about 200 kWh) that is compatible with rapid charging, and can calculate different charging rates, charging durations, and different prices corresponding to the different charging rates/durations. In some embodiments, the calculations associate with charging rates, charging durations, prices, etc., can be performed by the service computer 18 included in the cloud computing network 17.

In one or more non-limiting embodiments, the servicing host 16 can also receive account information identifying a user's account that is stored in the cloud computing network 17. The user's account can include a user profile that indicates various predetermined attributes set by the user such as, for example, predetermined charging rates, targeted charging levels, maximum cost payments, maximum charging durations, payment information (e.g., stored credit card information), etc. The servicing host 16 can access the user's stored profile and/or request the server computer 18 to provide the user's profile information. Based on the user's profile information, the servicing host 16 can automatically initiate battery charging service, and automatically collect payment for the charging service. In this manner, the battery 30 can be charged and payment completed according to the user's expectations with little to no intervention from the user.

Figure 3:
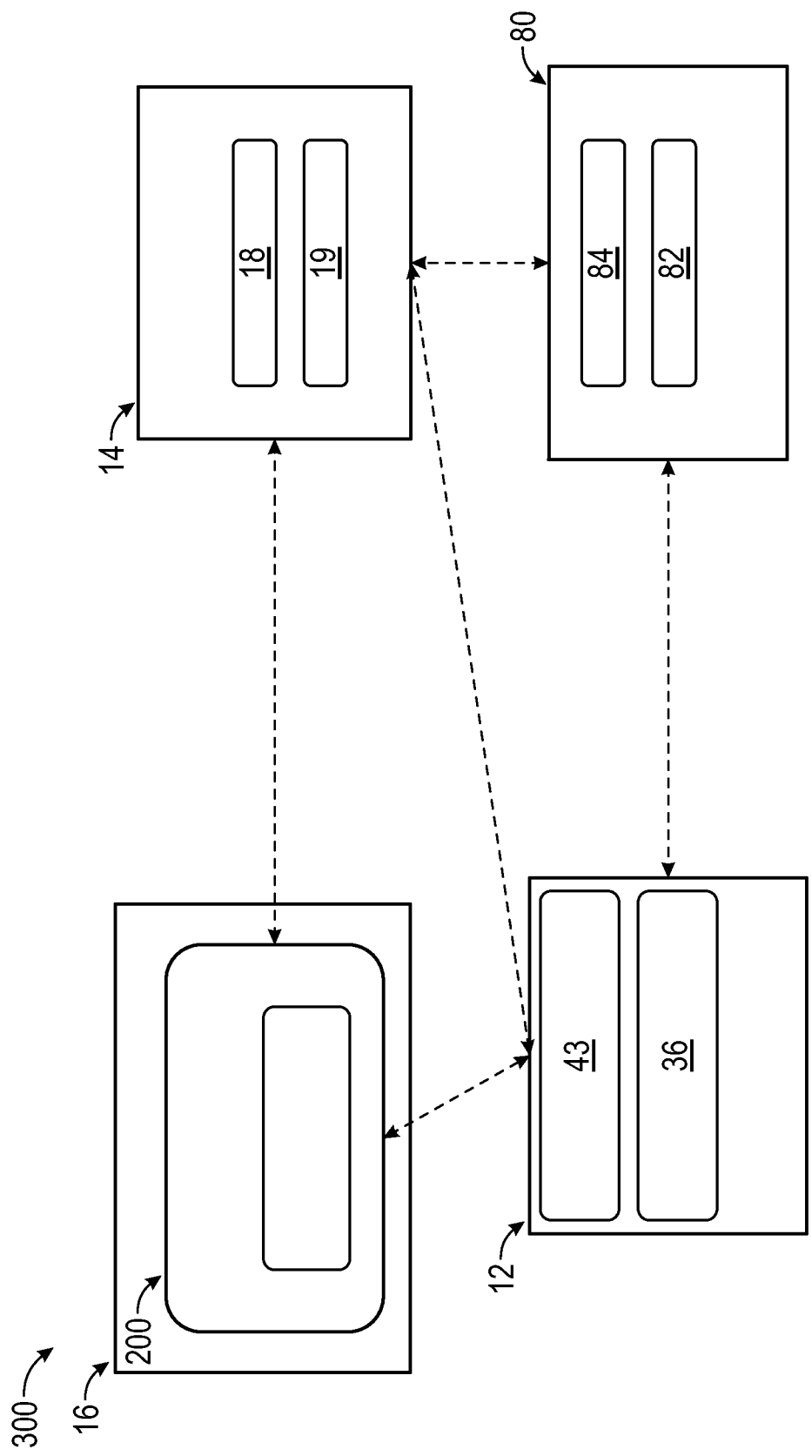
FIG. 3 is a block diagram depicting a network architecture of an automated vehicle initiated servicing system according to a non-limiting embodiment.

Turning to FIG. 3, a network architecture diagram 300 is illustrated according to a non-limiting embodiment. The network architecture diagram 300 depicts the data exchange associated with the service center 14, the servicing host 16, the vehicle 12, and the vehicle ad-hoc network 80. The service center 14 stores information pertaining to the services available to the vehicle 12 in the service cloud server 19, and produces the service handle container (e.g., QR code 204) that contains the encoded information or message indicative of the service provider's services. The service center 14 can place one or more servicing hosts 16 in the field (e.g., at various locations within a city) so that it can be utilized by the vehicle 12. When payment for a given service is successfully completed, the service computer 18 can output a control signal that commands the servicing host 16 to perform the service (e.g., initiates a charging station to begin charging the battery 30 of the vehicle 12).

Each servicing host 16 is in signal communication (e.g., via a wired and/or wireless connection) with the service center 14. The servicing host 16 includes the service handle container (e.g., a QR code 204), which can be detected by the vehicle 12. In one or more non-limiting embodiments, the service center 14 can update the data or message to be encoded in the QR code, deliver a digital image of the updated QR code to the servicing host 16 where it is displayed on a display unit. In this manner, the service information contained in the QR code can be dynamically updated.

The vehicle 12 can establish a wireless data connection with the servicing host 16 and the service center 14. Accordingly, the vehicle 12 can identify the servicing host 16 in response to detecting and processing the QR code 204 using the image sensor 43 and vehicle controller 36. Once the servicing host 16 is identified, the vehicle 12 can initiate a data exchange with the servicing host 16 and/or the service center 14. For example, the vehicle 12 can receive payment information for the various services provided by the service center 14 from the servicing host 16 and can send payment information, vehicle information such as, for example, battery information, and service selections to the servicing host 16. The servicing host 16 can then relay the data received from the vehicle 12 to the service center 14 in order to complete payment and initiate performance of the service. In another example, the vehicle 12 can receive cost information for the various services directly from the service center 14 and send payment information, vehicle information such as, for example, battery information, and service selections directly the service center 14.

The vehicle ad-hoc network 80 is configured to exchange data with the vehicle 12 and the service center 14. The vehicle ad-hoc network 80 can authorize the data exchange and service provided to the vehicle 12. For example, the vehicle ad-hoc network 80 can exchange data that establishes the service center 14 as an authorized service provider. When the vehicle 12 processes the QR code to determine the identity of the service provider, the ad-hoc computer 84 can search the ad-hock data base 82 to determine whether the servicing host 16 is associated with an authorized service provider. When the service provider is confirmed as being authorized, the ad-hoc computer 84 can authorize the vehicle 12 to exchange the vehicle information and payment information with the servicing host 16 and/or the service center 14. It should be appreciated that in some embodiments, the vehicle ad-hoc network 80 can be omitted without changing the scope of the present disclosure.

Figure 4:
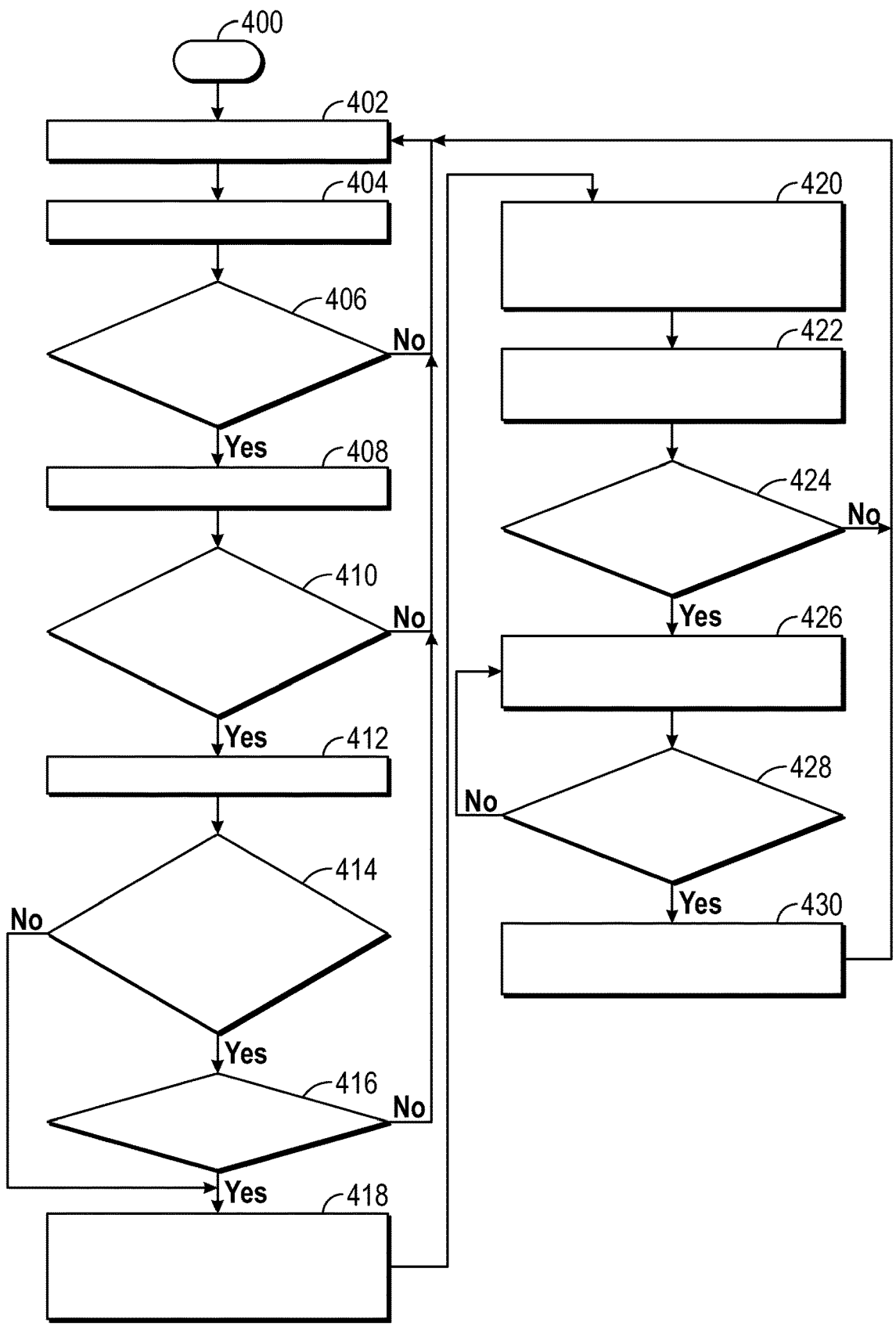
FIG. 4 depicts a flow diagram illustrating a method of automatically performing a vehicle service associated with a vehicle according to a non-limiting embodiment.

Referring now to FIG. 4, a method of automatically performing a vehicle service associated with a vehicle 12 is illustrated according to a non-limiting embodiment. The method begins at operation 400, and at operation 402 sensor data is generated by a vehicle sensor 43. The sensor data is processed by the vehicle controller 36 at operation 404, and at operation 406 a determination is made as to whether the sensor data indicates the presence of a service handle or service ID. The service ID can include, for example, a QR code that contains a message such as, for example, encoded data. When a service handle or service ID is not detected, the method returns to operation 402 and continues generating sensor data.

When, however, a service handle or service ID is detected, the method proceeds to operation 408 and the message (e.g., encoded data) is processed. At operation 410, a determination is made as to whether the message is secure. In one or more non-limiting embodiments a secure message includes encoded QR code data that is provided by an authorized service provider, while an unsecure message is encoded QR code data that is provided by an unauthorized service provider. When the message is unsecure, the method returns to operation 402 and continues generating sensor data.

When, however, the message is determined to be secure, the method proceeds to operation 412 and determines the type of service associated with the service ID. For example, the service ID can indicate that the vehicle 12 is located in the presence of an EV battery charging station capable of charging the vehicle battery 30. At operation 414, the method determines whether user approval is needed to initiate the service (e.g., battery charging). When user approval is not needed, vehicle information and/or user account information is provided (e.g., wirelessly) to the service center 14 and/or the servicing host 16 at operation 418. The vehicle information includes the vehicle's make and/or model and battery information. The account information includes a user's an account identification (ID) indicating an existing user account stored by the service center 14, a user's profile indicating predetermined or preferred service information, and payment information.

Referring back to operation 414, when user approval is needed, the vehicle controller 36 determines whether approval to initiate the service is received at operation 416. The approval can be provided in the form of an acknowledgement signal provided by a user's mobile device 57 and/or by the vehicle 12 (e.g., a user input to the vehicle display 38). When the approval is not received, the service is ignored and the method returns to operation 402 where sensor data continues to be generated. When, however, the approval is received, the vehicle information and/or user account information is provided (e.g., wirelessly) to the service center 14 and/or the servicing host 16 at operation 418.

Turning to operation 420, a data connection (e.g., a wireless data exchange) between the vehicle 12 and a service center 14 operated by a service provider is established. For example, the servicing host 16 can receive account information from the vehicle 12, and relay the account information to a cloud computing network 17 in signal communication with the service center 14. At operation 422, the service center 14 and the vehicle 12 can automatically initiate a mobile payment transaction associated with the service provided by the service provider. At operation 424, a determination is made as to whether the payment transaction is successfully completed. When the payment transaction is not successful, the vehicle service can be denied and the method returns to operation 402 where the vehicle 12 continues generating sensor data.

When, however, the payment transaction is successful, the service center 14 authorizes the performance of the requested service. Accordingly, the service computer 18 commands the servicing host 16 to initiate the service (e.g., battery charging) at operation 426. At operation 428, a determination is made as whether the service is completed. When the service is not completed, the method returns to operation 426 and continues performing the service. When, however, the service is completed, the data connection between the vehicle 12 and the service provider ends at operation 430 and the method returns to operation 402 where the vehicle 12 continues generating sensor data.

Figure 5A:
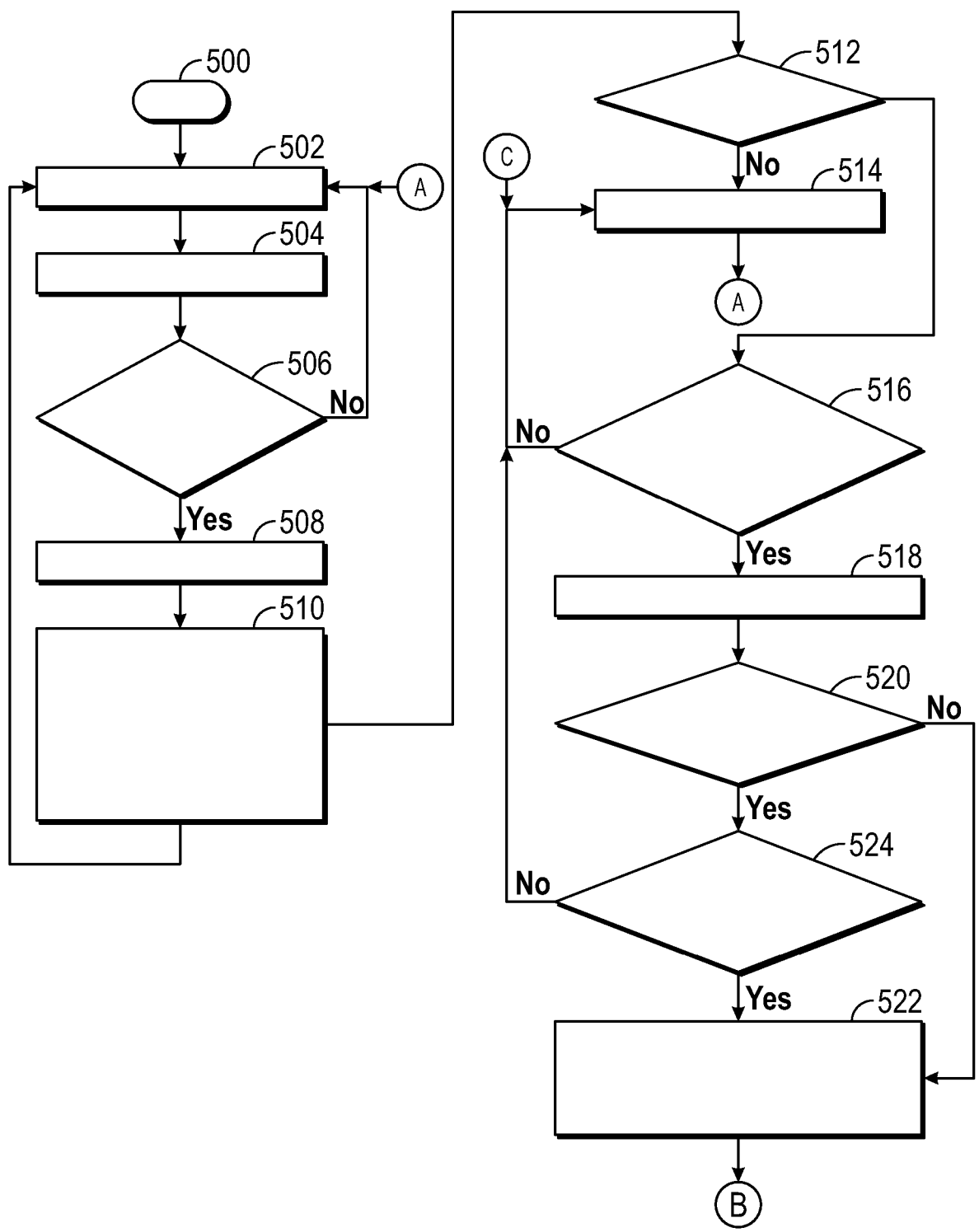
FIGS. 5A and 5B depict a flow diagram illustrating a method of automatically performing a vehicle service associated with a vehicle according to another non-limiting embodiment.
Figure 5B:
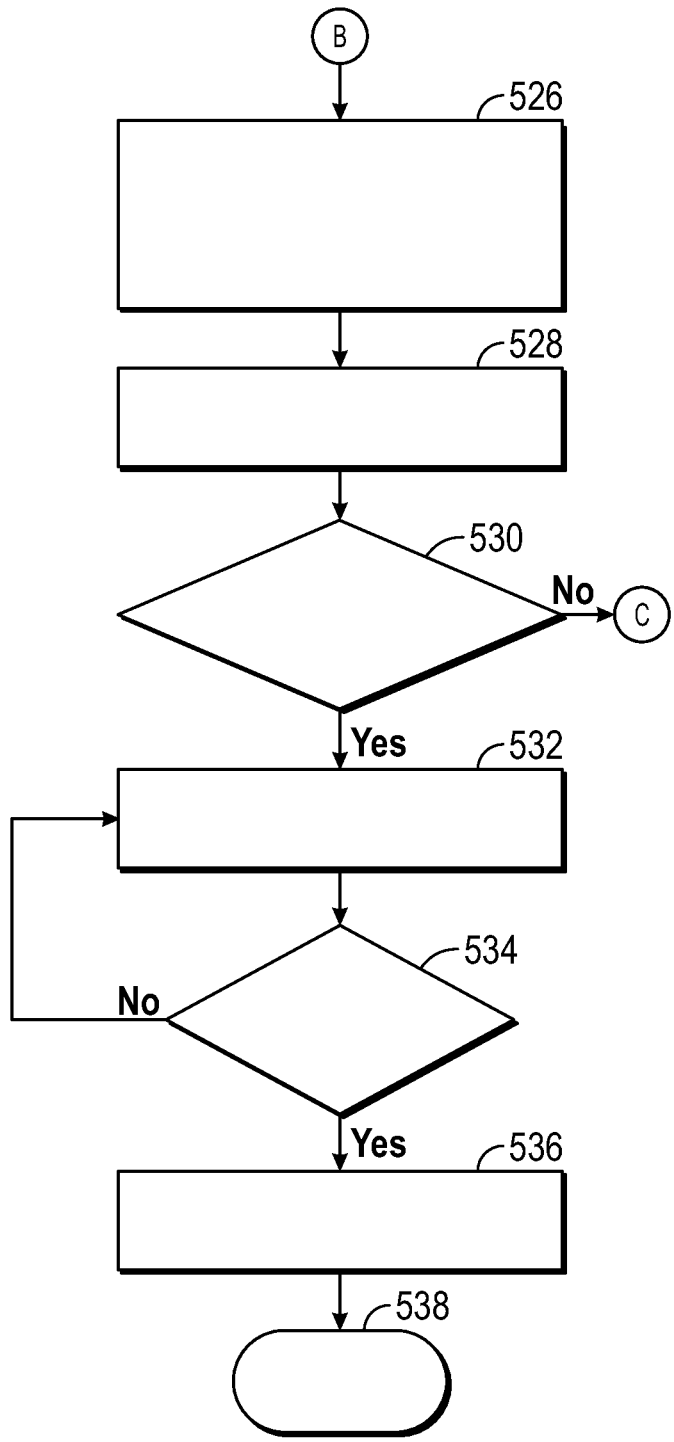

Referring to FIG. 5, a method of automatically performing a vehicle service associated with a vehicle 12 is illustrated according to another non-limiting embodiment. This embodiment illustrates the vehicle's capability to automatically initiate and perform multiple services and payment transactions without requiring an earlier initiated service to complete. The method begins at operation 500, and at operation 502 sensor data is generated by a vehicle sensor 43. The sensor data is processed by the vehicle controller 36 at operation 504, and at operation 506 a determination is made as to whether the sensor data indicates the presence of a service handle or service ID. The service ID can include, for example, a QR code that contains a message or encoded data. At operation 508, the service ID is processed. Processing the message can include, for example, processing the QR code to obtain the encoded data and service information provided by a corresponding service center 14. At operation 510, a vehicle process is initiated to automatically facilitate payment and performance of the service associated with the processed service ID, and the method returns to operation 502 to continue generating sensor data. Accordingly, the vehicle 12 can detect additional services IDs that may be present in the environment. When another service ID is available, the vehicle 12 can detect it at operation 502 execution operations 504-510 described herein to initiate a new separate vehicle process to facilitate performance of the service associated with the newly detected service ID. Thus, multiple vehicle processes can be initiated and executed simultaneously so that each executed vehicle process can facilitate payment and/or performance of a respective vehicle service.

Turning to operation 512, a determination is made as to whether initiation of the vehicle process at operation 510 is successful. A successful initiation includes, for example, a vehicle controller 36 is installed with the correct and/or up-to-date software to perform the operations necessary to facilitate payment and/or performance of a respective vehicle service, while an unsuccessful initiation includes missing and/or out-of-date software. When initiation of the vehicle process is not successful, a process error is determined at operation 514, and the method returns to operation 502 to continue generating sensor data. In one or more non-limiting embodiments, the determined process error can include generating an error message indicating an unsuccessful initiation of the vehicle process needed to facilitate performance of the service.

When initiation of the new vehicle process is successful, however, the method proceeds to operation 516 and determines whether the service ID is secure. As described herein, a secure message includes encoded QR code data that is provided by an authorized service provider while an unsecure message is encoded QR code data that is, for example, provided by an unauthorized service provider. When the message is unsecure, the method returns to operation 514 and determines a process error.

When, however, the message is determined to be secure, the method proceeds to operation 518 and determines the type of service associated with the service ID. For example, the service ID can indicate that the vehicle 12 is located in the presence of an EV battery charging station capable of charging the vehicle battery 30. At operation 520, the method determines whether user approval is needed to initiate the service (e.g., battery charging). When user approval is not needed, vehicle information and/or user account information is provided (e.g., wirelessly) to the service center 14 and/or the servicing host 16 at operation 522. The vehicle information includes the vehicle's make and/or model and battery information. The account information includes a user's an account identification (ID) indicating an existing user account stored by the service center 14, a user's profile indicating predetermined or preferred service information, and payment information.

Referring back to operation 520 when user approval is needed, the vehicle controller 36 determines whether approval to initiate the service is received at operation 524. The approval can be provided in the form of an acknowledgement signal provided by a user's mobile device 57 and/or by the vehicle 12 (e.g., a user input to the vehicle display 38). When the approval is not received, the vehicle service is ignored and a process error is determined at operation 514. When, however, the approval is received, the vehicle information and/or user account information is provided (e.g., wirelessly) to the service center 14 and/or the servicing host 16 at operation 522.

Turning to operation 526 (see FIG. 5B), a data connection (e.g., a wireless data exchange) between the vehicle 12 and a service center 14 operated by a service provider is established. For example, the servicing host 16 can receive account information from the vehicle 12, and relay the account information to a cloud computing network 17 in signal communication with the service center 14. At operation 528, the service center 14 and the vehicle 12 can automatically initiate a mobile payment transaction associated with the service provided by the service provider. At operation 530, a determination is made as to whether the payment transaction is successfully completed. When the payment transaction is not successful, the method can halt the service and determine a process error at operation 514.

When, however, the payment transaction is successful, the service center 14 authorizes the performance of the requested vehicle service. Accordingly, the service computer 18 commands the servicing host 16 to initiate the vehicle service (e.g., battery charging) at operation 532. At operation 534, a determination is made as whether the vehicle service is completed. When the vehicle service is not completed, the method returns to operation 532 and continues performing the service. When, however, the vehicle service is completed, the data connection between the vehicle 12 and the service provider ends at operation 536 and the vehicle service associated with the service ID processed at operation 508 is ended at operation 538.

As described herein, various non-limiting embodiments provide an automated vehicle initiated servicing system that eliminates one or more manual acts that are typically required when performing various vehicle servicing operations. In one example, an automated vehicle initiated servicing system is provided that can automatically initiate charging of an EV battery and automatically initiate and complete payment for charging the battery. It should be appreciated that other vehicle services can be employed such as vehicle washing, vehicle fueling, vehicle oil replacement, vehicle parking/valet servicing, etc., for example, without departing from the scope of the present disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A communication and control system for a vehicle, the communication and control system comprising:
   a servicing host configured to provide a vehicle service including charging an electric vehicle (EV) battery of the vehicle, the servicing host including a service identifier (ID) configured to indicate the vehicle service,
   a service computer in signal communication with the servicing host, the service computer configured to initiate the service host to perform the charging in response to receiving a successful payment; and a vehicle ad-hoc computing network in signal communication with the vehicle, the vehicle ad-hoc computing network configured to receive service information, to determine whether a service provider is an authorized service provider or an unauthorized service provider, wherein the vehicle is configured to actively detect the service ID and to determine the vehicle service in response to detecting the service ID, wherein the vehicle and the servicing host establish a wireless connection to exchange data and automatically initiate the vehicle service in response to detecting the service ID, wherein the vehicle ad-hoc computing network is configured to authorize the wireless connection in response to determining the authorized service provider or deny the wireless connection in response to determining the unauthorized service provider, wherein the data exchanged between the vehicle and the servicing host includes a vehicle type of the vehicle implementing the EV battery, specifications of the EV battery, a remaining available battery charge of the EV battery, and a payment information, wherein the servicing host calculates at least one charging rate to charge the EV battery based on the vehicle type of the vehicle implementing the EV battery, the specifications of the EV battery, and the remaining available battery charge of the EV battery, and wherein the service computer outputs a control signal to initiate the servicing host and automatically charge the EV battery according to the at least one charging rate in response to determining the successful payment based on the payment information received from the vehicle.

2. The system of claim 1, wherein automatically initiating the vehicle service comprises automatically initiating a payment transaction to perform the vehicle service, and wherein the servicing host automatically initiates the vehicle service in response to successfully completing the payment transaction.

3. The system of claim 2, wherein the service ID is a quick read (QR) code that provides the service information indicative of the vehicle service and the service provider associated with the vehicle service.

4. The system of claim 3, including an image sensor associated with the vehicle and configured to detect the QR code, wherein the vehicle determines the vehicle service in response to detecting the QR code.

5. The system of claim 2, wherein the service ID is a radio-frequency identification (RFID) tag that stores service information indicative of the vehicle service and the service provider associated with the vehicle service.

6. The system of claim 5, including an RFID reader associated with the vehicle and configured to detect the RFID tag and receive the service information transmitted from the RFID tag.

7. A method of performing a vehicle service, the method comprising:
providing, by a servicing host, a service identifier (ID) configured to indicate a vehicle service provided by the servicing host;
actively detecting, by a vehicle, the service ID, wherein actively detecting the service ID comprises:
wirelessly communicating the service information from the vehicle to an ad-hoc computing network;
determining, by the ad-hoc computing network, the authorized service provider or the unauthorized service provider;
authorizing, by the ad-hoc computing network, the data exchange in response to determining the authorized service provider; and
denying, by the ad-hoc computing network, the data exchange in response to determining the unauthorized service provider;
determining, by the vehicle, the vehicle service in response to detecting the service ID, the vehicle service including charging an electric vehicle (EV) battery of the vehicle;
establishing a wireless connection between the vehicle and the servicing host to exchange data and automatically initiate the vehicle service, the data exchanged including a vehicle type of the vehicle implementing the EV battery, specifications of the EV battery, a remaining available battery charge of the EV battery, and payment information;
calculating, by the servicing host, at least one charging rate to charge the EV battery based on the vehicle type of the vehicle implementing the EV battery, the specifications of the EV battery, and the remaining available battery charge of the EV battery;
outputting a control signal from a service computer to the servicing host to initiate the servicing host to perform the charging in response to determining the successful payment based on the payment information; and
in response to receiving the control signal, automatically charging the EV battery via the servicing host according to the at least one charging rate,
wherein establishing the wireless connection between the vehicle and the servicing host further comprises:
determining, by the vehicle, that the service provider is one of an authorized service provider or an unauthorized service provider;
establishing a data exchange with the vehicle in response to determining the authorized service provider; and
denying the data exchange with the vehicle in response to determining the unauthorized service provider.

8. The method of claim 7, further comprising:
automatically initiating a payment transaction to perform the vehicle service in response to detecting the service ID; and
automatically initiating the vehicle service by the servicing host in response to successfully completing the payment transaction.

9. The method of claim 8, wherein actively detecting the service ID comprises:
providing, by the servicing host, a quick read (QR) code that provides the service information indicative of the vehicle service and the service provider associated with the vehicle service;
detecting, by an image sensor installed on the vehicle, the QR code; and
processing the QR code to determine the vehicle service and the service provider.

10. The method of claim 8, wherein actively detecting the service ID comprises:
providing, by the servicing host, radio-frequency identification (RFID) tag that stores service information indicative of the vehicle service and a service provider associated with the vehicle service;
detecting, by an RFID reader installed on the vehicle, the RFID tag; and processing digital data received by the RFID tag to determine the vehicle service and the service provider.

11. The method of claim 10, wherein establishing the wireless connection between the vehicle and the servicing host further comprises:
- determining, by the vehicle, that the service provider is one of an authorized service provider or an unauthorized service provider;
- establishing a data exchange with the vehicle in response to determining the authorized service provider; and
- denying the data exchange with the vehicle in response to determining the unauthorized service provider.

* * * * *